(12) United States Patent
Dokuni (10) Patent No.: US 7,508,534 B2
(45) Date of Patent: Mar. 24, 2009

(54) IMAGE PROCESSING DEVICE (75) Inventor: Kenji Dokuni, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1006 days.

(21) Appl. No.: 10/951,991

(22) Filed: Sep. 28, 2004

(65) Prior Publication Data
US 2005/0073711 A1    Apr. 7, 2005

(30) Foreign Application Priority Data
Oct. 2, 2003    (JP)    ............... 2003-344525

(51) Int. Cl.
G06K 15/00    (2006.01)
H04N 1/46    (2006.01)
(52) U.S. Cl. ............... 358/1.14; 358/505; 358/1.16; 358/1.17
(58) Field of Classification Search ............... 358/474, 358/505, 1.16, 1.17, 1.15, 1.9, 403, 404, 358/448, 449, 452, 1.18, 1.1, 1.6, 1.14; 382/312, 382/254; 250/208.1; 715/500, 255
See application file for complete search history.

(56) References Cited

U.S. PATENT DOCUMENTS

| | | | | |
|---|---|---|---|---|
| 6,078,934 A * | 6/2000 | Lahey et al. | ............... | 715/255 |
| 6,262,732 B1 | 7/2001 | Coleman et al. | | |
| 6,643,028 B1 * | 11/2003 | Ogaki et al. | ............... | 358/1.6 |
| 6,771,383 B1 * | 8/2004 | Ogaki et al. | ............... | 358/1.15 |
| 6,825,942 B1 * | 11/2004 | Kamiyama et al. | ............... | 358/1.15 |
| 6,992,789 B2 * | 1/2006 | Czyszczewski et al. | ............ | 358/1.18 |
| 2003/0110442 A1 * | 6/2003 | Battle | ............... | 715/500 |
| 2003/0184801 A1 | 10/2003 | Murata | | |
| 2004/0042049 A1 * | 3/2004 | Hulan et al. | ............... | 358/404 |
| 2005/0190382 A1 * | 9/2005 | van Os | ............... | 358/1.1 |
| 2007/0013972 A1 * | 1/2007 | Sheng | ............... | 358/474 |

FOREIGN PATENT DOCUMENTS

| | | |
|---|---|---|
| EP | 1313004 A1 | 5/2003 |
| JP | 08-125817 | 5/1996 |
| JP | 09-062676 | 3/1997 |
| JP | 2000-172694 | 6/2000 |
| JP | 2002-337430 | 11/2002 |
| JP | 2003-087491 | 3/2003 |
| WO | 0197005 A1 | 12/2001 |

OTHER PUBLICATIONS

Japanese language office action and its English language translation for corresponding Japanese application No. 2003-344525 lists the references above.

* cited by examiner

Primary Examiner—Houshang Safaipour
(74) Attorney, Agent, or Firm—Hogan & Hartson LLP (57) ABSTRACT An image processing device includes an accumulating unit an information deleting unit and an information updating unit. The accumulating unit accumulates image information of a plurality of pages as a multipage file, wherein the multipage file includes identification information associated with the image information of each of the pages. The information deleting unit deletes image information of any page of the multipage file. The information updating unit updates, when image information of one or more of the pages of the multipage file has been deleted by the information deleting unit, identification information corresponding to the image information of the deleted page.

11 Claims, 9 Drawing Sheets

| IMAGE INFOR- MATION | PAGE 1 | PAGE 2 | PAGE 3 | PAGE 4 | PAGE 5 | PAGE 6 |
|---|---|---|---|---|---|---|
| PAGE INFOR- MATION | page 1<br><br>502KB<br><br>03/03/03 | page 2<br><br>477KB<br><br>03/03/03 | page 3<br><br>756KB<br><br>03/03/03 | page 4<br><br>623KB<br><br>03/03/03 | page 5<br><br>382KB<br><br>03/03/03 | page 6<br><br>808KB<br><br>03/03/03 |

| IMAGE INFOR- MATION | PAGE 1 | | PAGE 3 | | | PAGE 6 |
|---|---|---|---|---|---|---|
| PAGE INFOR- MATION | page 1<br><br>502KB<br><br>03/03/03 | page 2<br><br>DELETED USER A<br><br>03/03/03 | page 3<br><br>756KB<br><br>03/03/03 | page 4<br><br>DELETED USER A<br><br>03/03/03 | page 5<br><br>DELETED USER A<br><br>03/03/03 | page 6<br><br>808KB<br><br>03/03/03 |

BEFORE DELETION PROCESS

| IMAGE INFORMATION | PAGE 1 | PAGE 2 | PAGE 3 | PAGE 4 | PAGE 5 | PAGE 6 |
|---|---|---|---|---|---|---|
| PAGE INFORMATION | TOTAL NUMBER OF PAGES 6 ||||||

AFTER DELETION PROCESS

| IMAGE INFORMATION | PAGE 1 | | PAGE 3 | | | PAGE 6 |
|---|---|---|---|---|---|---|
| PAGE INFORMATION | TOTAL NUMBER OF PAGES 6 ||||||

IMAGE PROCESSING DEVICE

BACKGROUND OF THE INVENTION

1. Field of the Invention

The present invention relates to an image processing device, and more particularly to an image processing device which accumulates image information of a plurality of pages as a multipage file in an accumulating unit.

2. Description of the Related Art

A conventional image processing device accumulates image information of a plurality of pages scanned by an image scanning device such as a scanner as a multipage file in an accumulating unit such as a memory. For example, the multipage file includes image information of the plurality of pages and identification information of the image information.

A known image forming system can automatically make a backup of an image file by forwarding the image file to an image forming device of a contact destination when image information is changed by being deleted or inserted.

According to another known technology, a first page printing mode and a designated page printing mode are provided as a sample printing mode so that after an editing process, i.e., after deleting one or more of the pages, inserting a page or combining a plurality of files, a confirmation can be carried out reliably that the editing process has been carried out correctly.

However, in the conventional image processing device, it is difficult to recognize whether a multipage file has been accumulated under a state unchanged from the state when the multipage file was created, or under a state in which image information of one or more of the pages of the multipage file has been deleted. Moreover, for the multipage file in which the image information of one or more of the pages has been deleted, it is difficult to confirm which page has image information deleted.

SUMMARY OF THE INVENTION

An advantage of the present invention is to provide an image processing device which accumulates image information of a plurality of pages as a multipage file in an accumulating unit, which can delete image information of unnecessary pages of the multipage file and which can recognize reliably after the deletion process that the multipage file is a file in which the image information of one or more of the pages has been deleted.

According to an aspect of the present invention, an image processing device includes an accumulating unit which accumulates image information of a plurality of pages as a multipage file. The image processing device also includes an image information deleting unit and an identification information updating unit. The multipage file includes identification information associated with the image information of each of the pages. The image information deleting unit deletes image information of any page of the multipage file. When the image information of one or more of the pages of the multipage file has been deleted by the image information deleting unit, the identification information updating unit updates the identification information corresponding to the image information of the deleted page. Accordingly, only the image information of the unnecessary pages of the multipage file can be deleted. Moreover, by referring to the identification information of the multipage file after the deletion process, recognition can be carried out reliably that the multipage file is a file in which the image information of one or more of the pages has been deleted.

As an updating process of the identification information by the identification information updating unit, a process for adding a user name can be executed. In this case, by outputting the updated identification information in a form of a display or voice, the user can refer to the identification information of the multipage file after the deletion process (updating process). Accordingly, recognition can be made regarding who deleted one or more of the pages.

According to another aspect of the present invention, an image processing device includes an accumulating unit which accumulates image information of a plurality of pages as a multipage file. The image processing device also includes an image information deleting unit and a page information updating unit. The image information deleting unit deletes image information of one or more of a multipage file. When the image information of one or more of the pages of the multipage file has been deleted by the image information deleting unit, the page information updating unit maintains the page number before the deletion process for the image information of the undeleted remaining page(s). Accordingly, by referring to the page numbers of the multipage file, since the page numbers of the image information are nonconsecutive in the multipage file, recognition can be carried out reliably that the multipage file is a file in which the image information of one or more of the pages has been deleted.

The multipage file includes image information of a plurality of pages and identification information. The identification information includes information of a total number of pages of the image information. Accordingly, by referring to the identification information of the multipage file, even when the image information of a last page of the multipage file has been deleted, the page number of the deleted image information can be recognized.

When the image information of all of the pages of the multipage file has been deleted by the image information deleting unit, the entire multipage file is deleted from the accumulating unit. Accordingly, a meaningless multipage file not having any image information can be prevented from being formed.

DETAILED DESCRIPTION OF THE PREFERRED EMBODIMENTS

Referring to the attached drawings, preferred embodiments of the present invention will be described. In the following, an example of an image processing device having a scanner function will be described. The image processing device of the present embodiment can be applied to a copy machine, a facsimile machine, a multifunction peripheral or the like having the scanner function.

Figure 1:
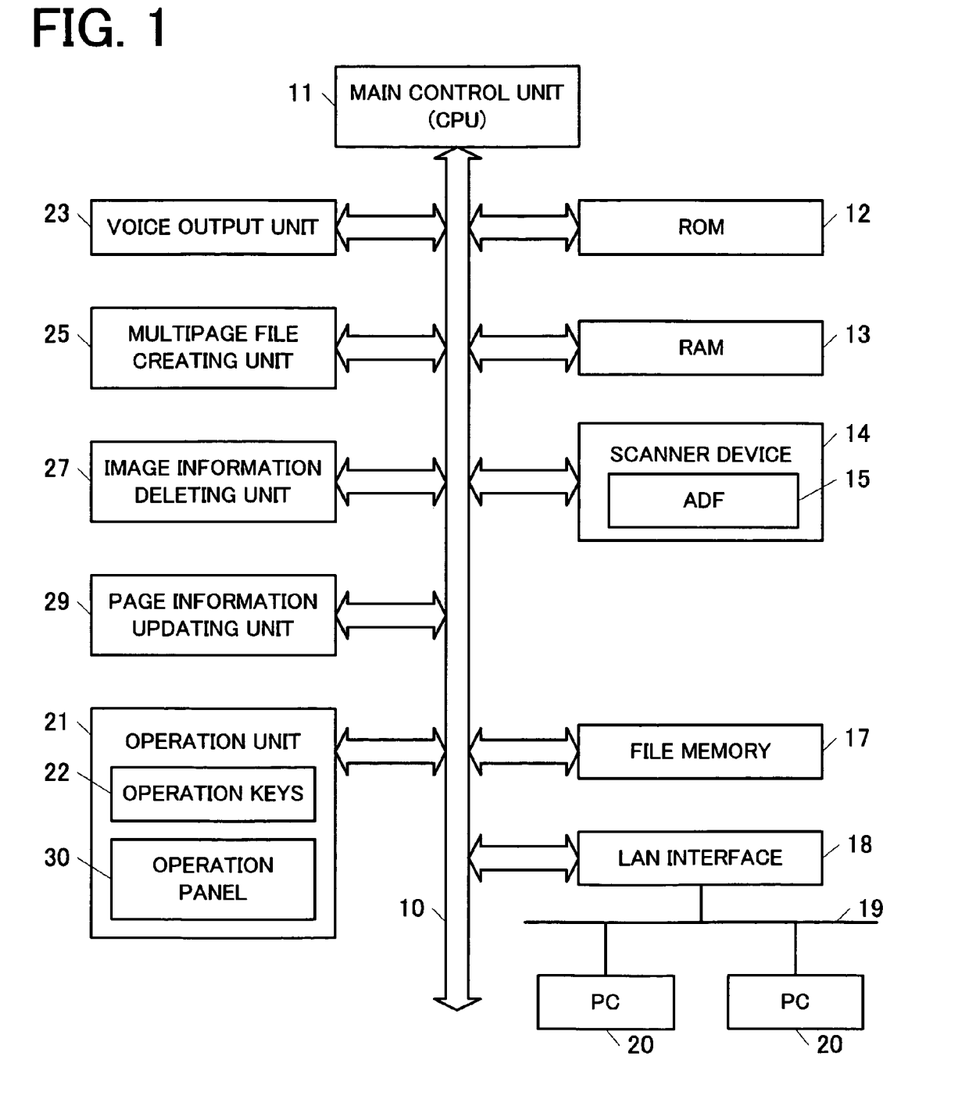
FIG. 1 is a block diagram showing an example of a control configuration of an image processing device according to an embodiment of the present invention.

Referring to FIG. 1, a schematic configuration of an image processing device will be described. The image processing device includes a Central Processing Unit (CPU) (main control unit) 11, a Read Only Memory (ROM) 12, a Random Access Memory (RAM) 13, a scanner device 14, a file memory 17, a Local Area Network (LAN) interface 18, an operation unit 21, a voice output unit 23, a multipage file creating unit 25, an image information deleting unit 27 and a page information updating unit 29. Each of the units is connected via a bus 10 in a manner that data communication can be carried out.

The CPU 11 controls each of the units of the image processing device in accordance with an input operation carried out from the operation unit 21 or the like. The ROM 12 stores a control program or the like for controlling the image processing device. The RAM 13 temporarily stores various pieces of information such as a control state of the image processing device.

The voice output unit 23 can be, for example, a voice output circuit having a speaker. The voice output unit 23 is operated when outputting a voice guidance. The image processing device can carry out data communication with a remote terminal device 20 such as a Personal Computer (PC) through a LAN 19 by the LAN interface 18.

The operation unit 21 includes various operation keys 22 which function as an input unit for operating the image processing device. An input operation made to each of the operation keys 22 is transmitted to the CPU 11. In accordance with the input operation, the image processing device is controlled.

The operation unit 21 includes an operation panel 30 which also functions as a display unit. That is, the operation panel 30 is formed of a display having a touch panel function. The operation panel 30 displays various pieces of information (character message) such as an operational state of the image processing device and/or an operational procedure of the image processing device. In addition, the operation panel 30 displays various operation keys which function as an input unit for operating the image processing device (refer to FIG. 3). Each of the various operation keys displayed on the operation panel 30 is changed according to the operational state of the image processing device. The CPU 11 (display control unit) retrieves operation panel data stored in the ROM 12 or the like, and displays the retrieved operation panel data on the operation panel 30. The input operation carried out on each of the operation keys displayed on the operation panel 30 is transmitted to the CPU 11. In accordance with the input operation, the image processing device is controlled.

The scanner device 14, which is an image scanning unit, optically scans an original document such as a photograph, a document, a drawing or the like. The scanner device 14 measures the strength of a reflected light and/or a transmitted light and carries out an Analog-to-Digital (AD) conversion. Then, the scanner device 14 outputs image information which is image data. The scanner device 14 includes an Automatic Document Feeder (ADF) 15. The scanner device 14 can continuously scan a plurality of original documents set at the ADF 15 one sheet at a time by the ADF 15. The image information of the original documents scanned by the scanner device 14 is accumulated in the file memory 17, which is an accumulating unit. In place of the image scanning process using the ADF 15, or in addition to the image scanning process using the ADF 15, the scanner device 14 can carry out an image scanning process of an original document set on a document placing table by using a moving scanning unit while pressing the original document by a cover. Further, the scanner device 14 can use a monochrome scanner having only a monochrome scanning function. Moreover, the scanner device 14 can use a color scanner having both a monochrome scanning function and a color scanning function.

The image processing device according to the present embodiment accumulates in the file memory 17, a multipage file created by scanning an original document by the scanner device 14. A multipage file is created by continuously scanning the original documents one sheet at a time by the scanner device 14. The multipage file includes image information of a plurality of pages. For example, the image information can be accumulated in the file memory 17 as a file of a Tagged Image File Format (TIFF) or a Joint Photographic Experts Group (JPEG) format. The multipage file is created by the multipage file creating unit 25. The multipage file creating unit 25 creates a multipage file from the image information of a plurality of pages that is generated continuously by the scanning process of the scanner device 14. Specifically, the multipage file creating unit 25 is formed of a program or a circuit. Further, in case the multipage file creating unit 25 is formed of a program (a program for the creating process), the program is stored in the ROM 12. The CPU 11 retrieves the program stored in the ROM 12 and expands the program in the RAM 13. Then, by executing the program, a creating process of a multipage file is carried out.

In case the image information scanned by the scanner device 14 is only one page, the image information is accumulated in the file memory 17 as a single-page file and not as a multipage file. In the following description, the description will be made of a file created as a multipage file formed from a plurality of pages. A file created as a single-page file will not be considered.

Figure 2:
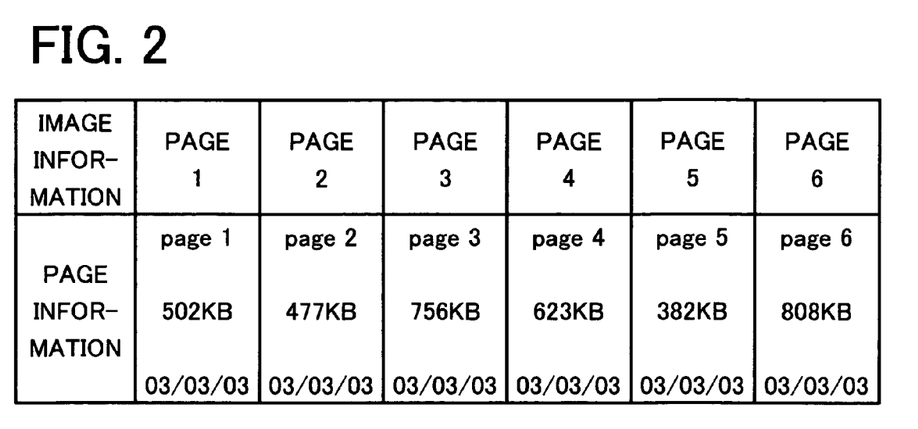
FIG. 2 shows a structure of a multipage file.

A multipage file includes image information of a plurality of pages and page information. The multipage file shown in FIG. 2 is formed from image information of six pages. As shown in FIG. 2, the multipage file includes page information associated with image information of each of the pages. The page information exists for each of the pages. The page information corresponds to management information (identification information) of the image information of each of the pages. In the example shown in FIG. 2, the page information includes a page number, a size of the image information and a creation date when the multipage file was created.

The image information deleting unit 27 can delete image information of any page among a plurality of image information of the multipage file. For example, by operating the operation unit 21 by a user, the image information of any page can be deleted. A page to be deleted can be designated by operating the operation unit 21. The image information deleting unit 27 is provided for deleting the image information of the multipage file. The image information deleting unit 27 is formed of a program or a circuit. Further, in case the image information deleting unit 27 is formed of a program (a program for the deletion process), the program is stored in the ROM 12. The CPU 11 retrieves the program stored in the ROM 12 and expands the program in the RAM 13. By executing the program, a deletion process of one or more or all of the pages is carried out.

When the image information of one or more of the pages has been deleted, the page information updating unit 29 controls to update the page information corresponding to the image information of the deleted page. That is, the page information is updated by the updating process carried out by the page information updating unit (identification information updating unit) 29. The page information updating unit 29 is provided for updating the page information of the multipage file. The page information updating unit 29 is formed of a program or a circuit. Further, in case the page information updating unit 29 is formed of a program (a program for the updating process), the program is stored in the ROM 12. The CPU 11 retrieves the program stored in the ROM 12 and expands the program in the RAM 13. Then, by executing the program, an updating process of the page information is carried out.

Figure 3:
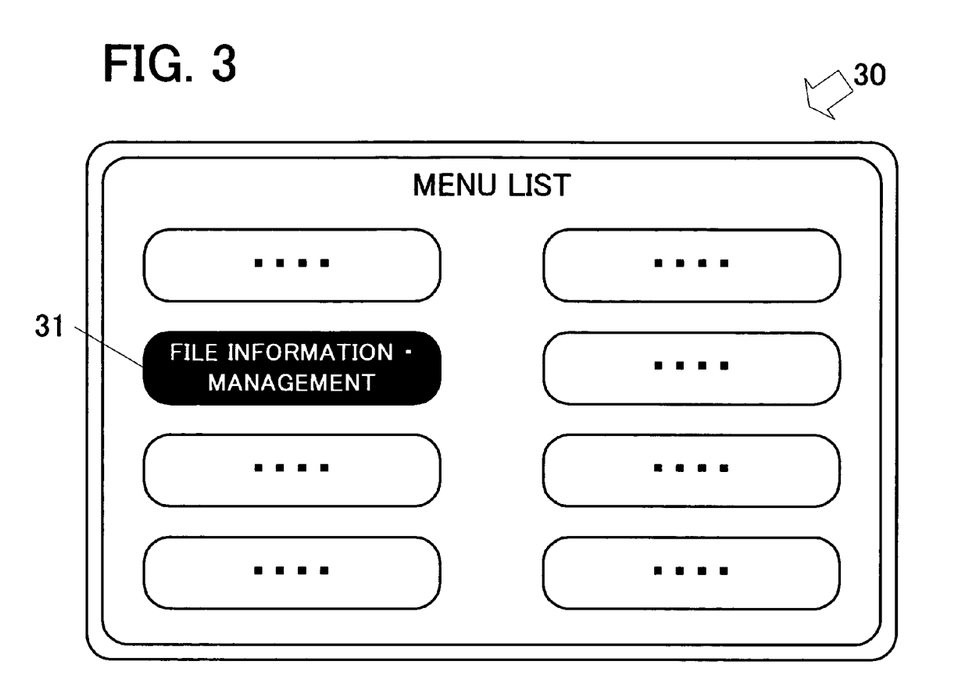
FIG. 3 shows an operation panel displaying a menu list.
Figure 4:
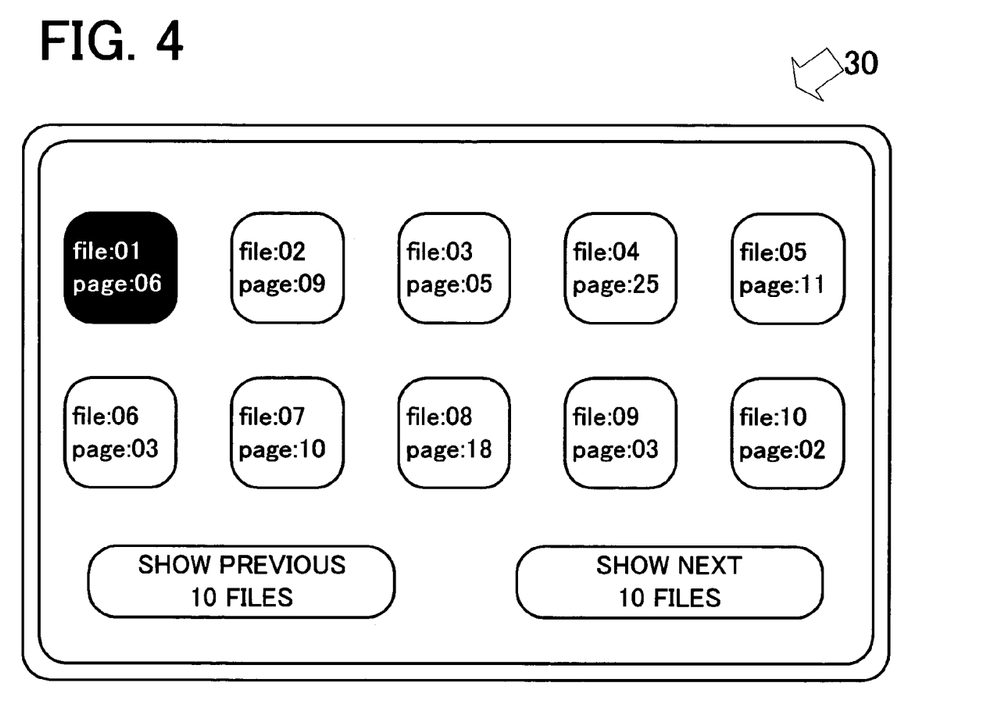
FIG. 4 shows an operation panel displaying a list of multipage files accumulated in a file memory.
Figure 5:
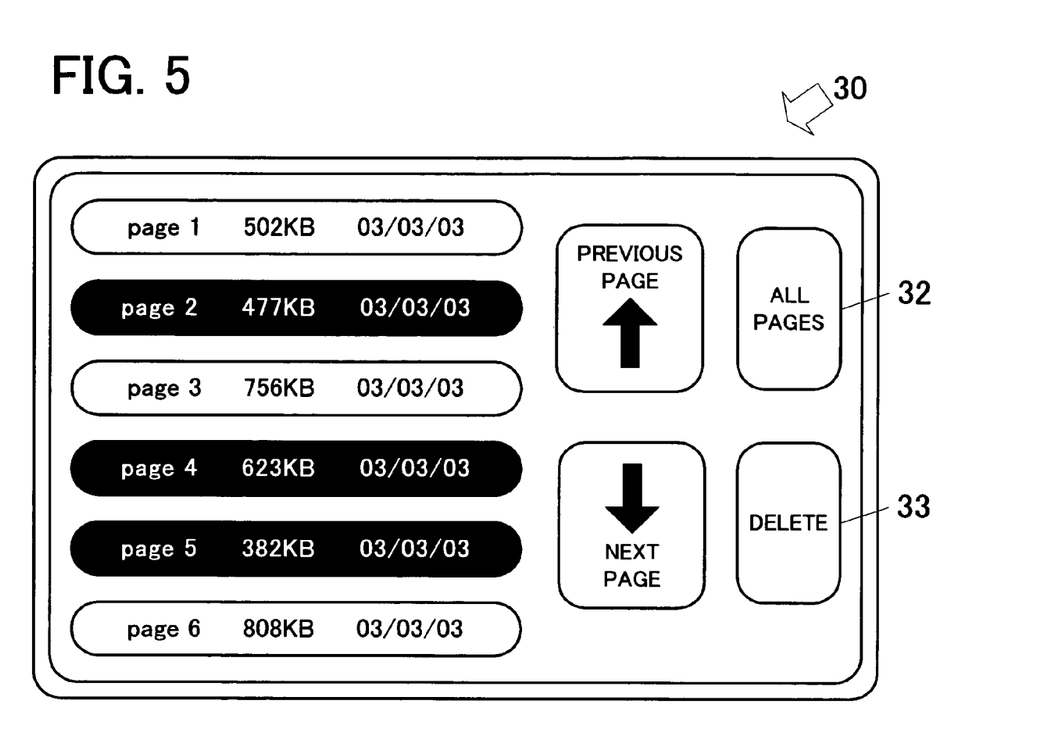
FIG. 5 shows an operation panel displaying page information of a multipage file.

Next, a description will be made of a control process carried out when deleting the image information of one or more of the pages of the multipage file. When a plurality of multipage files are accumulated in the file memory 17, displayed contents of the operation panel 30 are switched as shown in FIG. 3 through FIG. 5 as an example. As described above, each of the multipage files includes the image information of a plurality of pages. As shown in FIG. 3, FIG. 4 and FIG. 5, the information relating to the multipage files is displayed hierarchically on the operation panel 30. In this case, by operating the operation panel 30, the display of the operation panel 30 is switched sequentially.

FIG. 3 shows a menu list of the image processing device displayed on the operation panel 30. The menu list includes an item ("FILE INFORMATION-MANAGEMENT") to be designated for displaying a list of the multipage files accumulated in the file memory 17. As shown in FIG. 3, a displayed color of the designated item is reversed. FIG. 3 shows a state in which a part 31 displaying the item "FILE INFORMATION MANAGEMENT" has been operated (pressed) by a user. By this operation, the displayed contents of the operation panel 30 are switched to a display screen of a list as shown in FIG. 4. From the display screen of the list, the multipage files accumulated in the file memory 17 can be referenced.

In the display screen of the list shown in FIG. 4, for each of the multipage files accumulated in the file memory 17, a file name (file number) and a number of pages are displayed, respectively. As shown in FIG. 4, a displayed color of a part of the designated multipage file is reversed. FIG. 4 shows a state in which the user has selected (designated) one multipage file (file name "file:01") from the displayed plurality of multipage files. That is, FIG. 4 shows a state in which the user has operated (pressed) the part displaying the information of the multipage file having the file name "file:01". By this operation, the displayed contents of the operation panel 30 are switched into a deletion designating screen shown in FIG. 5. From the deletion designating screen, the contents (page information) of each page of the designated multipage file can be referenced.

The deletion designating screen of FIG. 5 displays contents of one designated multipage file, in other words, the page information corresponding to the image information of each page of the multipage file. The displayed items of the page information include a page number, a size of the image information and a creation date when the multipage file was created. The creation date can be the date and time of creation including the time when the multipage file was created. From the deletion designating screen, the user can designate one or more or all of the pages to be deleted. That is, from the deletion designating screen, the user can designate a page number to be deleted and instruct an execution of a deletion process. As shown in FIG. 5, a displayed color of a part of the designated page information is reversed. FIG. 5 shows a state in which the user has selected (designated) some of the pages (pages 2, 4 and 5) to be deleted. That is, FIG. 5 shows a state in which the parts displaying the page information of page 2, page 4 and page 5 have been operated (pressed) for the multipage file (total of six pages) having the file name "file:01".

As shown in FIG. 5, after the page to be deleted has been designated, when a delete key 33 is operated (pressed), the image information of the designated page is deleted. That is, the multipage file is updated into a state in which the designate page has been deleted. In the present embodiment, to prevent necessary image information from being deleted by unspecified users, in other words, to permit only a specific user to delete unnecessary image information, the following input operation of a user name and a password is requested.

Figure 6:
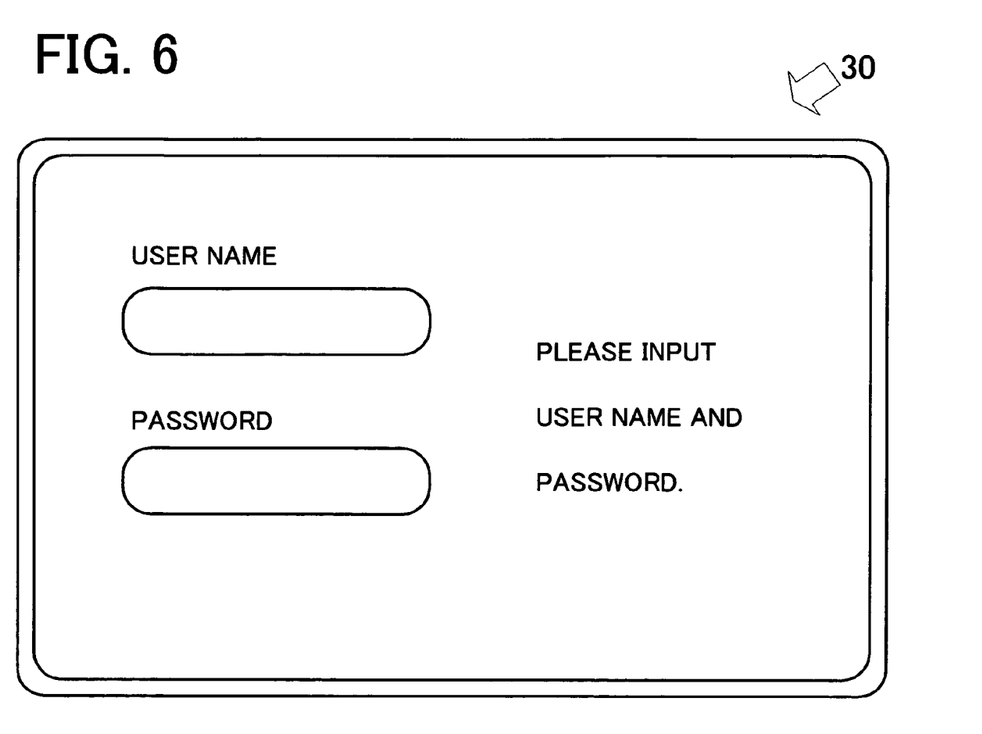
FIG. 6 shows an operation panel displaying an individual authentication input screen for inputting a user name and a password.

When the delete key 33 is pressed, an individual authentication input screen as shown in FIG. 6 is displayed on the operation panel 30. The individual authentication input screen is a screen for inputting the user name and the password. The user name and the password are input by operating the operation keys 22 of the operation unit 21. Further, an alternative of the operation keys 22 of the operation unit 21 can be displayed on the operation panel 30 and the user name and the password can be input by operating the operation panel 30.

The user name and the password are previously stored (registered) in the RAM 13 by being associated with one another. In case the user name and the password input to the individual authentication input screen of the operation panel 30 do not correspond with the contents previously stored in the RAM 13, the operation panel 30 displays a message indicating that there is a mistake in the input contents and a message suggesting to input the user name and the password again.

Meanwhile, in case the input user name and password correspond with the contents previously stored in the RAM 13, the image information of the designated page is deleted from the multipage file. As described above, the deletion process is carried out by the image information deleting unit 27. In the above-described manner, only the image information of the unnecessary pages of the multipage file can be deleted. When carrying out the deletion process, the page information corresponding to the image information of the deleted page is not deleted but is updated. As described above, the page information is updated by the page information updating unit 29. That is, when one or more of the pages has been deleted, the page information updating unit 29 does not deleted the page information of the deleted page from the multipage file but maintains the page information in the multipage file under a state in which the contents are updated.

Figure 7:
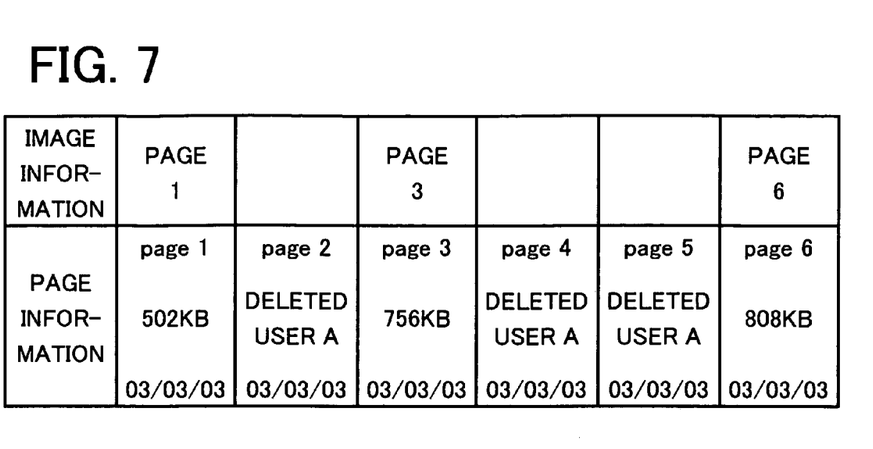
FIG. 7 shows a structure of a multipage file in which image information of one or more of the pages has been deleted.

As shown in FIG. 7, the multipage file after the deletion process and the updating process includes image information of the undeleted pages (image information of the remaining pages), the page information corresponding to the image information of the remaining pages and the page information corresponding to the image information of the deleted pages. That is, the multipage file after the deletion process and the updating process does not include data of the image information deleted in the deletion process. As described above, the page information corresponding to the image information of the deleted page is updated by the updating process of the page information updating unit 29. Specifically, as shown in FIG. 2, the page information before the updating process includes the page number, the size and the creation date of the image information. Meanwhile, as shown in FIG. 7, the page information after the updating process includes the page number of the image information, the user name of the user who deleted the image information and the deletion date. The user name of the user who deleted the image information is the user name input from the input screen (FIG. 6) of the operation panel 30. The deletion date is the date when the image information associated with the page information was deleted. Further, the page numbers of the remaining image information that were not deleted (FIG. 7) maintain the page numbers before the deletion process (FIG. 2). The page information after the deletion process (FIG. 7) includes information indicating the content of the process (deletion process) executed on the page.

Figure 8:
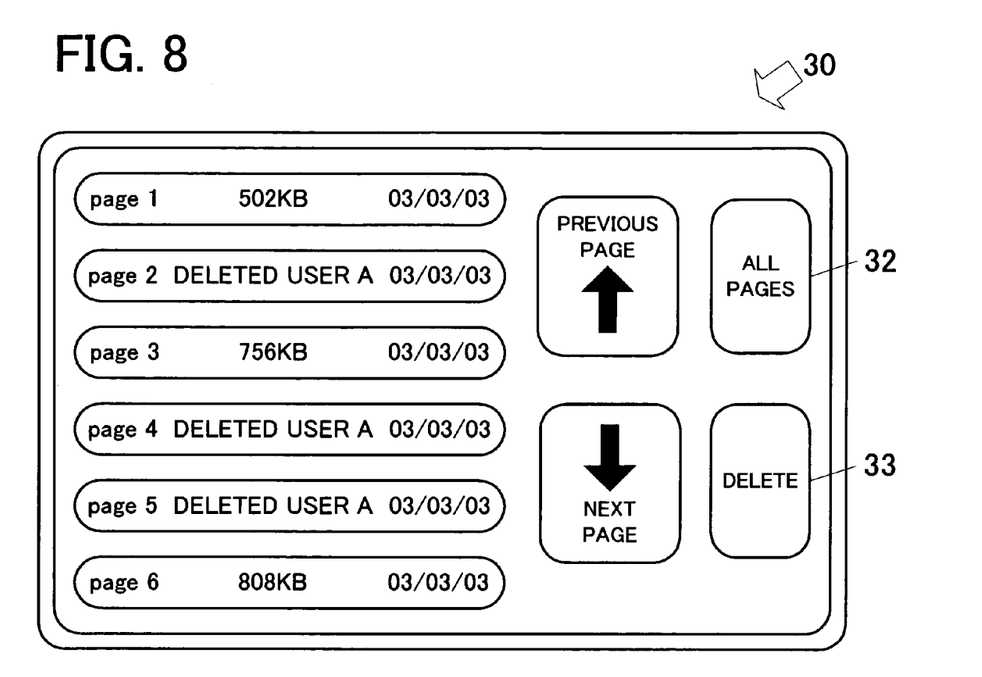
FIG. 8 shows an operation panel displaying page information of the multipage file in which the image information of one or more of the pages has been deleted.

Then, the operation panel 30 displays a message indicating that the deletion process has been completed and a message indicating that the page information has been updated. FIG. 8 shows an example of a deletion designating screen of the multipage file in which the image information of one or more of the pages has been deleted. FIG. 8 shows a state in which after the image information of one or more of the pages of the multipage file has been deleted (after the deletion process and the updating process), the contents of the multipage file, in other words, the updated page information is displayed on the operation panel 30. As described above, the letters "DELETED" are displayed on the operation panel 30 for the deleted pages (in FIG. 8, page 2, page 4 and page 5). Therefore, by referring to the page information of the multipage file as shown in FIG. 8, the user can reliably recognize that it is the multipage file which the image information of one or more of the pages has been deleted due to some reasons. In addition, the user can recognize the page number of the deleted image information. Moreover, since the user name of the user who deleted the image information is displayed, the user can recognize who deleted one or more of the pages.

The control process carried out when deleting the image information of one or more of the pages of the multipage file has been described above. However, the image information of all of the pages of the multipage file can be deleted by the deletion process of the image information deleting unit 27. A control process carried out in this case differs from the control process carried out when deleting the image information of one or more of the pages. That is, when deleting all of the pages, an "all pages" key 32 is operated (pressed) under a state in which the contents (page information) of the multipage file are displayed on the operation panel 30 (refer to FIG. 5). The "all pages" key 32 is a key for collectively designating the image information of all of the pages included in the multipage file. By operating the key 32, the image information of all of the pages included in the multipage file is designated to be deleted.

After pressing the delete key 33 and inputting the user name and the password, in case the input user name and the password correspond with the contents previously stored in the RAM 13 (same as described above), the image information of all of the pages is deleted and the entire multipage file is deleted from the file memory 17. As described above, in case the image information of all of the pages of the multipage file has been deleted, the entire multipage file is controlled to be deleted from the file memory 17. That is, by designating all of the pages of the multipage file to be deleted, the entire multipage file can be deleted. Therefore, a meaningless multipage file not having image information is prevented from being formed. Further, even in case the user manually inputs a numerical value of a page number to be deleted, when the manually input page number (range of page numbers) corresponds to all of the pages included in the file, the image information deleting unit 27 recognizes that the deletion of all of the pages has been designated. That is, in case the pages to be deleted designated by a method other than the operation of the "all pages" key 32 correspond to all of the pages of the file, the image information deleting unit 27 deletes the entire multipage file from the file memory 17.

Further, before deleting the entire multipage file, an alarm can be generated informing that the entire multipage file will be deleted by this operation. This alarm can be generated by displaying a message on the operation panel 30 or outputting a voice guidance from the voice output unit 23. In case of displaying a message on the operation panel 30, the message can be displayed together with the individual authentication input screen for inputting the user name and the password.

Figure 9:
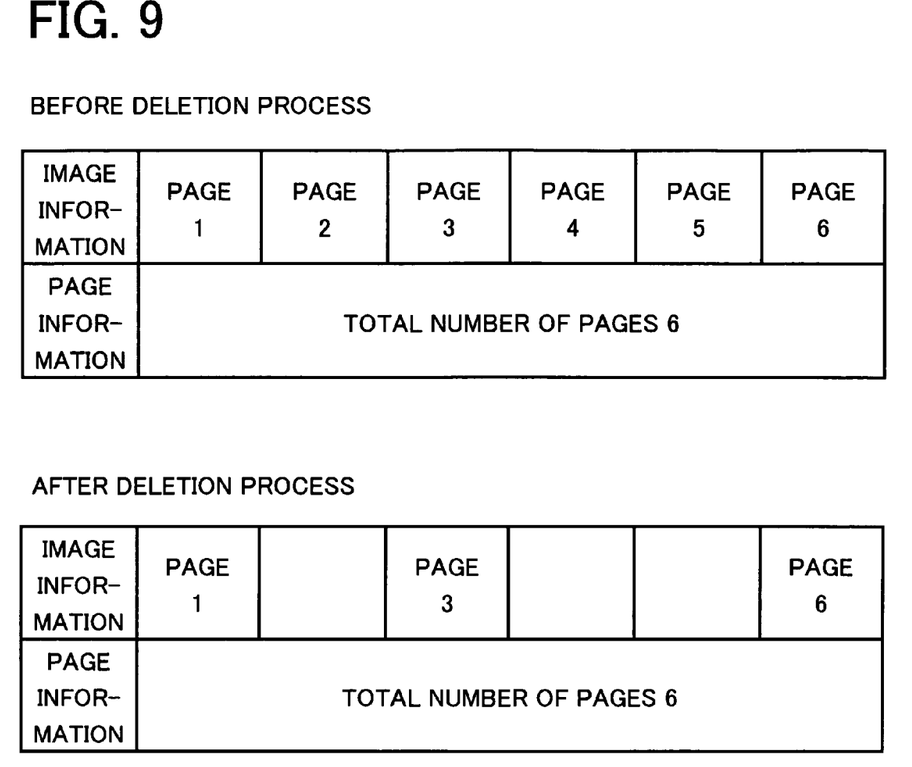
FIG. 9 shows a structure of a multipage file having a different structure.

The above-described multipage file (refer to FIG. 2) can also be formed as shown in FIG. 9. In the multipage file shown in FIG. 9, the page information is only information of a "total number of pages". Moreover, the page information can be only "information of total number of pages" and "information of page number". The "information of total number of pages" as the page information is a total number of pages when the multipage file was created by a scanning process of original documents or the like. When the image information of one or more of the pages of the multipage file has been deleted, the page number of the undeleted remaining image information maintains the page number before the deletion process. Then, the information of the total number of pages stays the same (FIG. 9).

Accordingly, in the multipage file after the deletion process, the page numbers of the image information are nonconsecutive numbers (refer to FIG. 9). Therefore, recognition can be made reliably that the multipage file is a file in which the image information of one or more of the pages has been deleted. The page number of the deleted image information can be recognized. Since the information of the total number of pages is held, even when the image information of the last page of the multipage file has been deleted, the page number of the deleted image information can be recognized reliably. However, in case the multipage file has a simple structure, the user name of the user who deleted the image information or the deletion date cannot be specified.

In the above-described embodiment, by operating the operation unit 21 (the operation panel 30), the operation of the image processing device, in other words, the operation for deleting the image information of the multipage file is carried out. However, the operation of the image processing device can be carried out from the remote terminal device 20 such as a PC connected by the LAN 19 (network) In case of carrying out the operation from the remote terminal device 20, the display of the operation panel 30 (refer to FIG. 3, FIG. 4, FIG. 5, etc.) is displayed on a display of the remote terminal device 20. In addition, instead of operating the operation unit 21 (operation panel 30), a keyboard or a mouse is operated. In this case, since the remote terminal device 20 can be specified when carrying out a communication, a process for inputting the user name and the password when deleting the image information can be omitted.

Moreover, in the above-described embodiment, with the input of the user name and the password to the individual authentication input screen (FIG. 6) as a permitting condition, the image information of any page of the multipage file can be deleted. However, the input of the user name and the password is not an indispensable permitting condition. That is, the permitting condition can be the input of only the user name, without requiring the input of the password. Even in this case, the user name can be added to the identification information in the updating process. Moreover, both the user name and the password can be excluded from the permitting condition, and the image information of one or more or all of the pages can be deleted. In this case, for example, when the delete key 33 is operated in FIG. 5, without displaying FIG. 6, in other words, without requesting an input of the user name and the password, a process for deleting the image information of the designated page can be executed.

What is claimed is:

1. An image processing device, comprising:
    means for accumulating image information of a plurality of pages as a multipage file, wherein the multipage file includes identification information associated with the image information of each of the pages,
    means for deleting image information of any page of the multipage file; and
    means for updating, when image information of one or more of the pages of the multipage file has been deleted by the means for deleting, identification information corresponding to the deleted information of one or more of the pages;
wherein
    the identification information includes page number information,
    the means for updating maintains a content of the page number information of the identification information corresponding to the image information of the deleted page or pages in a state before the image information has been deleted, as an updating process of the identification information corresponding to the image information of the deleted page or pages,
    the identification information includes size information of the image information, and
    when the image information of one or more of the pages of the multipage file has been deleted by the means for deleting, as an updating process of the identification information corresponding to the image information of the deleted page, the means for updating executes a process for deleting prescribed deletion information.

2. The image processing device according to claim 1, wherein
    when the image information of one or more of the pages of the multipage file has been deleted by the means for deleting, as an updating process of the identification information corresponding to the image information of the deleted page, the means for updating executes a process for adding prescribed additional information.

3. The image processing device according to claim 2, wherein the prescribed additional information includes a deletion date.

4. The image processing device according to claim 2, wherein the means for deleting executes a process for deleting the image information of any page of the multipage file with at least an input of a user name as a permitting condition; and
    the prescribed additional information includes a user name input in an instruction operation of deleting image information.

5. The image processing device according to claim 4, wherein the means for deleting deletes the image information of any page of the multipage file with an input of the user name and a passwords as a permitting condition.

6. The image processing device according to claim 1 wherein the deletion information includes the size information indicating a data size of the image information.

7. The image processing device according to claim 1, wherein when the image information of all of the pages of the multipage file has been deleted, the means for deleting deletes the multipage file from the means for accumulating in its entirety.

8. The image processing device according to claim 1, wherein
    when the image information of one or more of the pages of the multipage file has been deleted by the means for deleting, the means for updating maintains a content of the page number information of the identification information corresponding to the image information of an undeleted remaining page in a state before deleting the image information of any page of the multipage file.

9. The image processing device according to claim 1, further comprising:
    a display unit which displays a prescribed message; and
    a display control unit which controls displayed contents of the display unit,
    wherein on a deletion designating screen for deleting the image information of one or more of the pages of the multipage file, the display control unit displays the identification information corresponding to the image information of each of the pages of the multipage file.

10. The image processing device according to claim 9, wherein on the deletion designating screen of the multipage file in which the image information of one or more of the pages has been already deleted, the display control unit displays contents updated by the means for updating as the identification information corresponding to the image information of each of the pages of the multipage file.

11. The image processing device according to claim 1, further comprising:
    a scanner device which continuously scans a plurality of original documents one sheet at a time; and
    means for creating the multipage file from the image information of the plurality of pages generated continuously by the scanning process of the scanner device.

* * * * *